(12) United States Patent
Lin

(10) Patent No.: US 10,963,071 B2
(45) Date of Patent: Mar. 30, 2021

(54) MOUSE

(71) Applicant: Chicony Electronics Co., Ltd., New Taipei (TW)

(72) Inventor: I-Fu Lin, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/579,810

(22) Filed: Sep. 23, 2019

(65) Prior Publication Data

US 2020/0333893 A1  Oct. 22, 2020

(30) Foreign Application Priority Data

Apr. 22, 2019 (TW) ................................. 108114031

(51) Int. Cl.
*G06F 3/0354* (2013.01)
(52) U.S. Cl.
CPC ................ *G06F 3/03543* (2013.01)
(58) Field of Classification Search
CPC ........ G06F 3/03543; G06F 2203/0333; G09G 5/08; G09G 5/00
See application file for complete search history.

(56) References Cited

U.S. PATENT DOCUMENTS

| 10,025,397 | B1* | 7/2018 | Lai | G06F 3/03543 |
| 2002/0067336 | A1* | 6/2002 | Wegmuller | G06F 3/016 |
| | | | | 345/156 |
| 2006/0044270 | A1* | 3/2006 | Chen | G06F 3/03543 |
| | | | | 345/163 |
| 2006/0170655 | A1* | 8/2006 | Hou | G06F 3/03543 |
| | | | | 345/163 |
| 2006/0181512 | A1* | 8/2006 | Wang | G06F 3/03543 |
| | | | | 345/163 |
| 2007/0132733 | A1* | 6/2007 | Ram | G06F 3/03543 |
| | | | | 345/163 |
| 2009/0009473 | A1* | 1/2009 | Ho | G06F 3/03543 |
| | | | | 345/163 |
| 2011/0037697 | A1* | 2/2011 | Mao | G06F 3/03543 |
| | | | | 345/163 |
| 2011/0141017 | A1* | 6/2011 | Ku | G06F 3/03543 |
| | | | | 345/163 |
| 2012/0293414 | A1* | 11/2012 | Wang | G06F 3/03543 |
| | | | | 345/163 |

(Continued)

*Primary Examiner* — Christopher E Leiby
(74) *Attorney, Agent, or Firm* — CKC & Partners Co., LLC

(57) ABSTRACT

A mouse includes a pressure detector, a top housing, a first button, a first position limiter, and a second position limiter. The top housing is disposed on the pressure detector and has a first hole, a second hole, and a third hole. The second hole is located between the first hole and third holes. A first button is disposed on the top housing and has a first protruding portion, a second protruding portion, and a third protruding portion protruding toward the top housing. The first, second and third protruding portions are respectively aligned with the first, second and third holes. The second protruding portion extends toward the pressure detector through the second hole. The first position limiter is connected to the first protruding portion. The second position limiter is connected to the third protruding portion. The top housing is located between the first button and the second position limiter.

11 Claims, 8 Drawing Sheets

(56) References Cited

U.S. PATENT DOCUMENTS

| | | | |
|---|---|---|---|
| 2015/0123904 A1* | 5/2015 | Wang | G06F 3/03543 345/163 |
| 2019/0107900 A1* | 4/2019 | Tseng | G06F 3/03543 |
| 2019/0146600 A1* | 5/2019 | Tsai | G06F 3/0202 345/163 |
| 2020/0081558 A1* | 3/2020 | Chu | G06F 3/03543 |

* cited by examiner

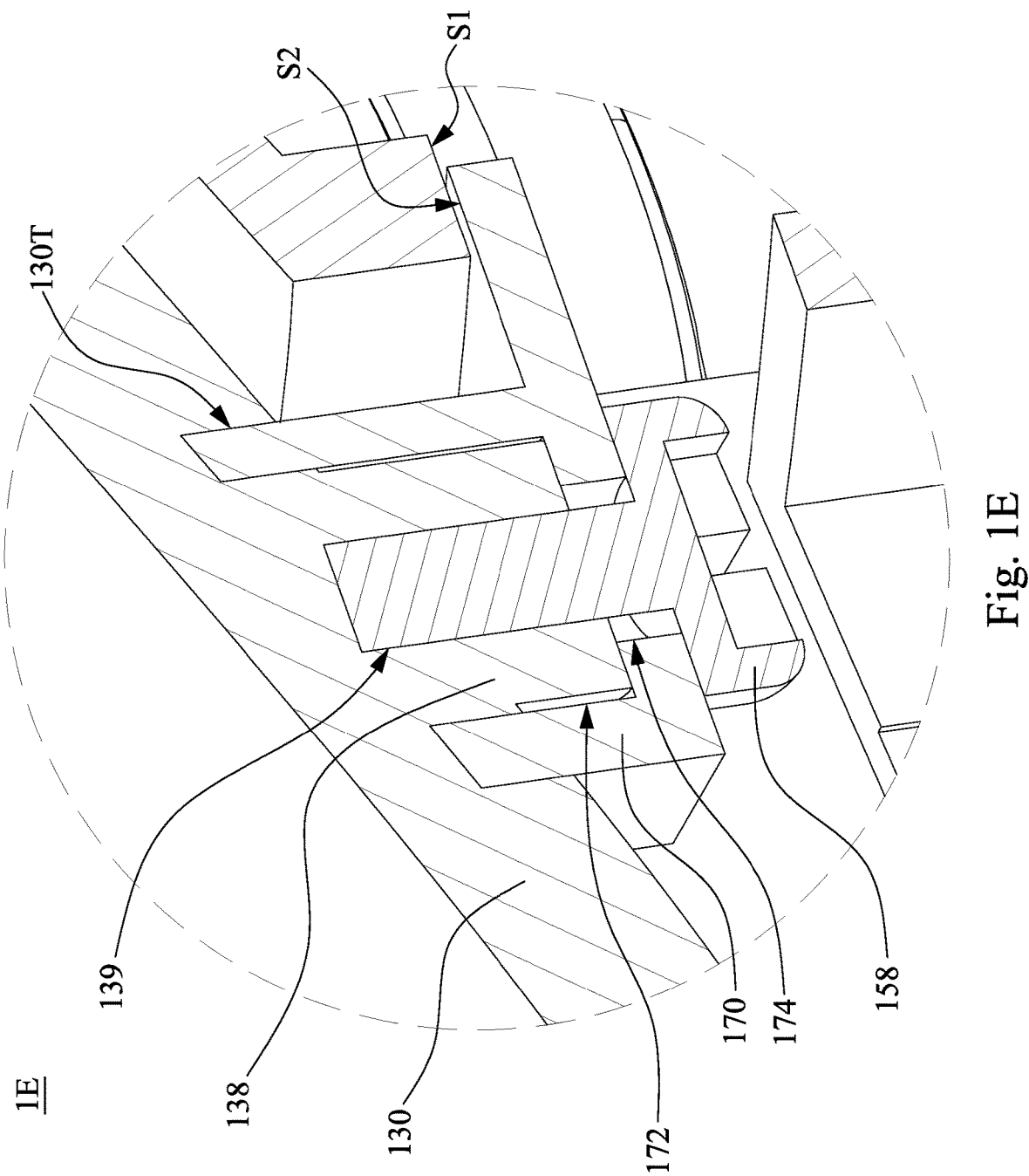

MOUSE

RELATED APPLICATIONS

This application claims priority to Taiwanese Application Serial Number 108114031, filed Apr. 22, 2019, which is herein incorporated by reference.

BACKGROUND

Technical Field

The present disclosure relates to a mouse.

Description of Related Art

With development of technology, computer devices have been developed to achieve various uses, such as leisure activity, paperwork, and drawing. During an operation to a computer device, a mouse can serve as an input device for the user to the computer device. Accordingly, the mouse has become an important part of a consumer market, and the research and thus development regarding the mouse has attracted attention. For example, with respect to function thereof, some mice have been added with extra buttons. With respect to appearance thereof, some mice have been designed to comply ergonomic further. With different requirements, how to enlarge a range of mouse button that is pressable to act, thereby providing a better use experience for a user, has become a current research-and-development direction in the related field.

SUMMARY

An aspect of the present disclosure is to provide a mouse including a pressure detector, a top housing, a first button, a first position limiter, and a second position limiter. The top housing is disposed on the pressure detector and has a first hole, a second hole, and a third hole, in which the second hole is located between the first hole and the third hole. A first button is disposed on the top housing and has a first protruding portion, a second protruding portion, and a third protruding portion protruding toward the top housing. The first protruding portion is aligned with the first hole. The second protruding portion is aligned with the second hole and extends toward the pressure detector through the second hole. The third protruding portion is aligned with the third hole. The first position limiter is connected to the first protruding portion, in which the top housing is located between the first button and the first position limiter. The second position limiter is connected to the third protruding portion, in which the top housing is located between the first button and the second position limiter.

In some embodiments, the top housing has a front end and a back end which are opposite each other. The second position limiter is closer to the front end than the first position limiter, and the first position limiter is closer to the back end than the second position limiter.

In some embodiments, the mouse further includes a second button disposed on the top housing, and the first button and the second button are separated from each other.

In some embodiments, the top housing further has a fourth hole. The second button has a fourth protruding portion aligned with the fourth hole and protruding toward the top housing. The first position limiter is connected to the fourth protruding portion such that the first button indirectly connected to the second button by the first position limiter.

In some embodiments, the mouse further includes a case disposed on the top housing, in which the case, the first button, and the second button are separated from each other.

In some embodiments, the first button further has a pressing surface that faces away from the top housing and is a curved surface.

In some embodiments, the mouse further includes a bottom housing. The top housing is assembled on the bottom housing. A distance from the top housing to the bottom housing gradually decreases from a position corresponding to the first hole to a position corresponding to the third hole.

In some embodiments, the second position limiter has a concave, and the third protruding portion extends into the concave.

In some embodiments, the second position limiter has an opening, and the third protruding portion has a screw hole. The mouse further includes a screw element passing through the opening and screwed into the screw hole.

In some embodiments, the top housing has a first abutting surface facing away from the first button, and the second position limiter has a second abutting surface facing the first abutting surface. The first abutting surface is located between the first button and the second abutting surface.

In some embodiments, the second protruding portion overlaps with a line connecting the first protruding portion and the third protruding portion.

BRIEF DESCRIPTION OF THE DRAWINGS

FIG. 1E is a schematic enlarged view of an area 1E in FIG. 1D;

DETAILED DESCRIPTION

Figure 1A:
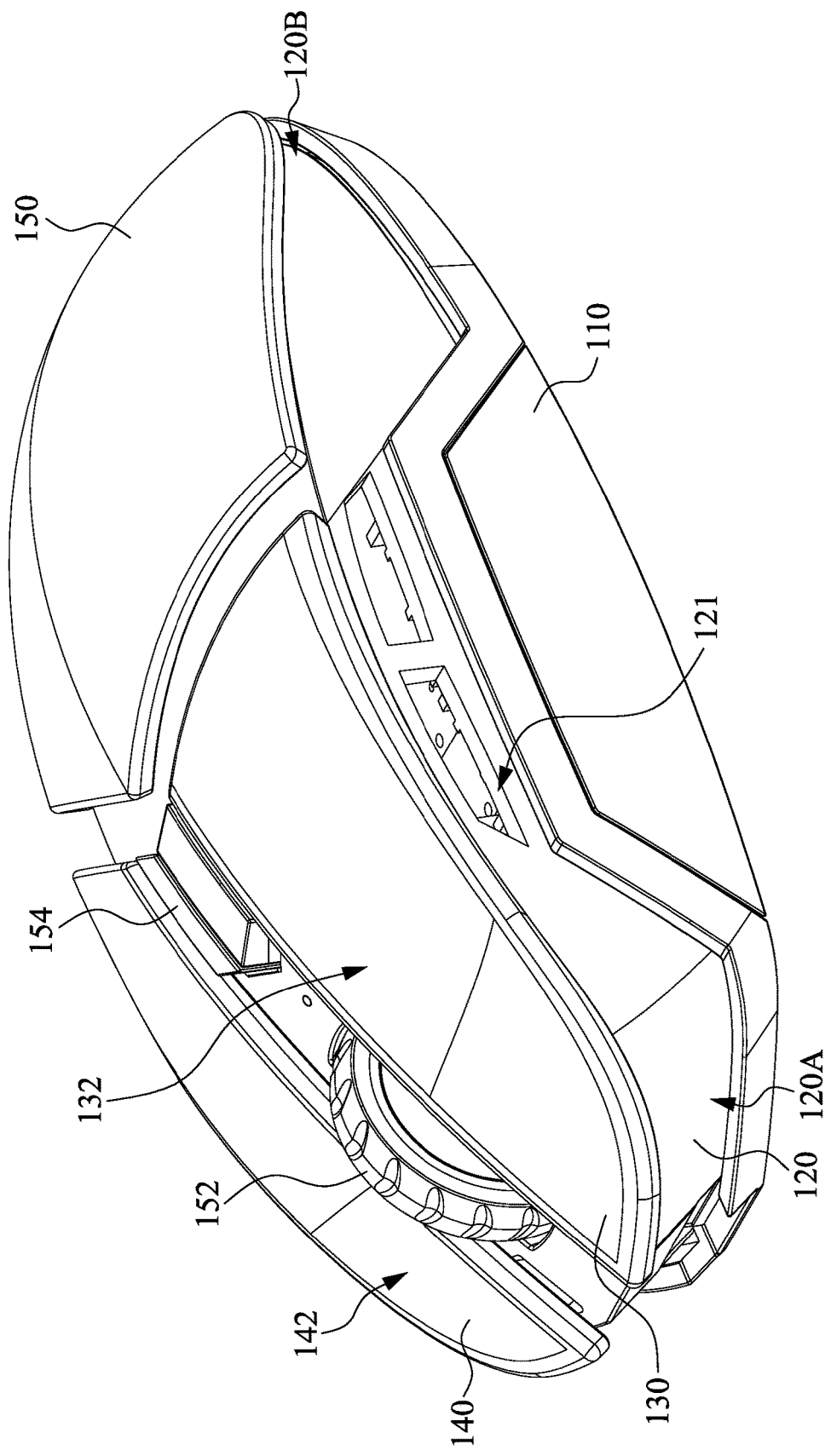
FIG. 1A is a schematic perspective view illustrating a mouse according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing, and like reference numerals refer to like elements throughout.

It will be understood that, although the terms "first," "second," etc., may be used herein to describe various elements, components, or areas, these elements should not be limited by these terms. These terms are used to distinguish one element, component, or area from another. For example, a first element could be termed a second element, and, similarly, a second element could be termed a first element, without departing from the scope of the embodiments. As used herein, the term "and/or" includes any and all combinations of one or more of the associated listed items. Furthermore, as used herein, the term "connect" means either "directly connect" or "indirectly connect".

Figure 1B:
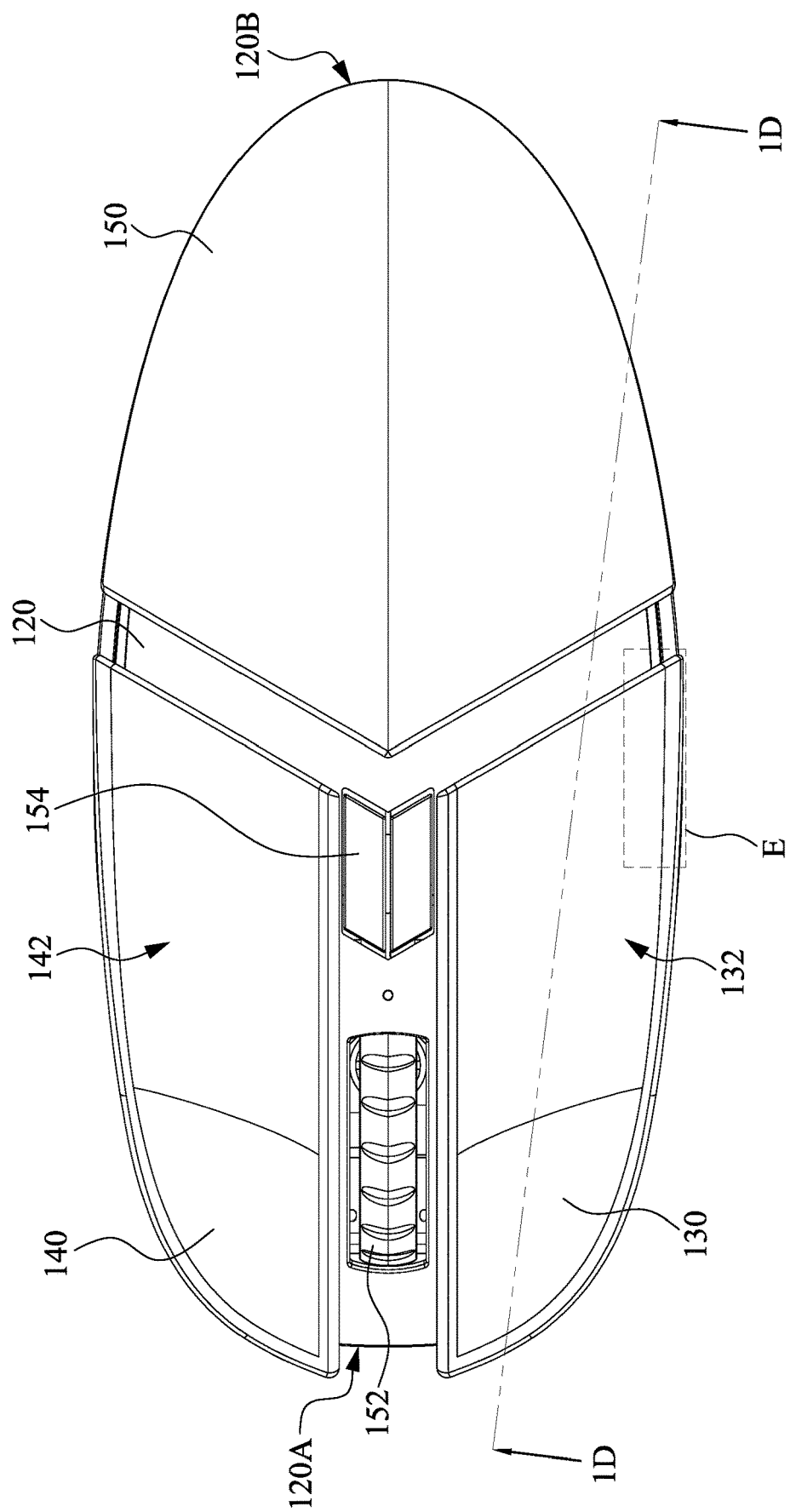
FIG. 1B is a top view of the mouse in FIG. 1A.
Figure 1C:
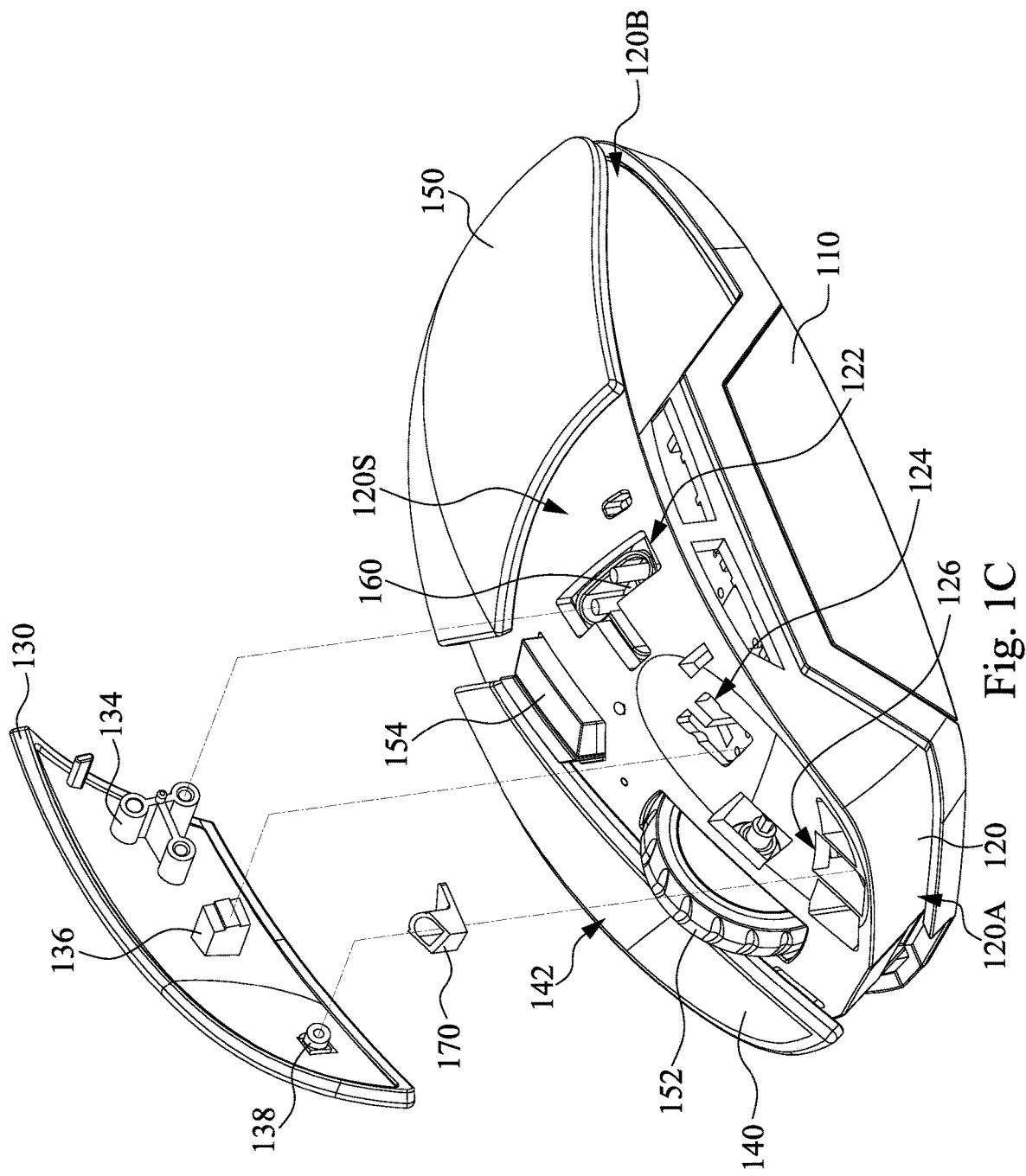
FIG. 1C is a schematic perspective view illustrating the mouse in FIG. 1A with a first button detached from a top housing.

Reference is made to FIGS. 1A, 1B, and 1C. FIG. 1A is a schematic perspective view illustrating a mouse 100A according to a first embodiment of the present disclosure. FIG. 1B is a top view of the mouse 100A in FIG. 1A. FIG. 1C is a schematic perspective view illustrating the mouse 100A in FIG. 1A with a first button 130 detached from a top housing 120.

The mouse 100A includes a bottom housing 110, a top housing 120, a first button 130, a second button 140, a case 150, a roller 152, and an identifying structure 154. The top housing 120 is assembled on the bottom housing 110, and the first button 130, the second button 140, the case 150, and the identifying structure 154 are disposed on the top housing 120. The top housing 120 may has extra grooves 121 which can be configured to provide space for arranging function buttons (not illustrated).

The first button 130, the second button 140, and the case 150 are respectively disposed on difference regions of the top housing 120. That is, the difference regions of the top housing 120 can be respectively covered by the first button 130, the second button 140, and the case 150. The top housing 120 has a front end 120A and a back end 120B which are opposite each other. The first button 130 and the second button 140 are closer to the front end 120A than the case 150, and the case 150 is closer to the back end 120B than the first button 130 and the second button 140. The first button 130, the second button 140, and the case 150 are separated from each other. As used herein, the description "the first button 130, the second button 140, and the case 150 are separated from each other" means the first button 130, the second button 140, and the case 150 can be individually detached from the top housing 120. For example, as shown in FIG. 1C, since the first button 130 and the second button 140 are separated from each other, the first button 130 can be detached from the top housing 120 with the second button 140 connected to the top housing 120 still. In addition, such disposition can be referred to as that the first button 130, the second button 140, and the case 150 are individually disposed on the top housing 120.

By this arrangement, it is advantageous to assemble or detach the mouse 100A. Moreover, since the first button 130 and the second button 140 are separated from each other, each of the first button 130 and the second button 140 has a specific boundary, so as to make a user know where a pressable range for pressing the mouse 100A is located.

Furthermore, the first button 130 and the second button 140 respectively have pressing surfaces 132 and 142 facing away from the top housing 120. Each of the pressing surfaces 132 and 142 can serve as a contact surface when a user performs a pressing or click operation with the mouse 100A. In some embodiments, each of the pressing surfaces 132 and 142 can be designed as a curved surface, thereby providing better holding experience for a user. More specifically, each of the pressing surfaces 132 and 142 can extend along a curve path from a position above the top housing 120 to out a side of the top housing 120, and the pressing surfaces 132 and 142 have curved boundaries. In addition, the roller 152 and the identifying structure 154 can be disposed between the first button 130 and the second button 140.

The following descriptions are provided to state a relationship between the top housing 120 and the first button 130, and the relationship between the top housing 120 and the first button 130 can be similar to or even the same as a relationship between the top housing 120 and the second button 140. Therefore, the following descriptions regarding the relationship between the top housing 120 and the first button 130 can be correspondingly applied to the relationship between the top housing 120 and the second button 140.

As shown in FIG. 1C, the top housing 120 has a first hole 122, a second hole 124, and a third hole 126, in which the second hole 124 is located between the first hole 122 and the third hole 126. The positions of the first hole 122, the second hole 124, and the third hole 126 can be gradually closer to the front end 120A of the top housing 120 in sequence. A top surface 120S of the top housing 120 may also be a curved surface, such that a distance from the top housing 120 to the bottom housing 110 gradually decreases from a position corresponding to the first hole 122 to a position corresponding to the third hole 126. In other words, heights of the first hole 122, the second hole 124, and the third hole 126 with respect to the bottom housing 110 are different than each other.

The first button 130 has a first protruding portion 134, a second protruding portion 136, and a third protruding portion 138. The first protruding portion 134, the second protruding portion 136, and the third protruding portion 138 are located at the same side of the first button 130 and protrude toward the top housing 120. The second protruding portion 136 is located between the first protruding portion 134 and the third protruding portion 138. When assembling the mouse 100A, the first protruding portion 134, the second protruding portion 136, and the third protruding portion 138 can be respectively aligned with the first hole 122, the second hole 124, and the third hole 126. After assembling the mouse 100A, the first protruding portion 134, the second protruding portion 136, and the third protruding portion 138 can be respectively located in the first hole 122, the second hole 124, and the third hole 126. In some embodiments, after assembling the mouse 100A, a distance from the third protruding portion 138 to the bottom housing 110 is less than a distance from the first protruding portion 134 to the bottom housing 110 and less than a distance from the second protruding portion 136 to the bottom housing 110. Furthermore, the first button 130 may further have a positioning structure corresponding to the top housing 120.

Moreover, the mouse 100A may further include a first position limiter 160 and a second position limiter 170. The second position limiter 170 is closer to the front end 120A of the top housing 120 than the first position limiter 160, and the first position limiter 160 is closer to the back end 120B of the top housing 120 than the second position limiter 170. The first position limiter 160 and the second position limiter 170 can be respectively connected to the first protruding portion 134 and the third protruding portion 138 of the first button 130, so as to confine a movable distance of the first button 130 above the top housing 120. Structures and functions of the first position limiter 160 and the second position limiter 170 will be further described as follows.

Figure 1D:
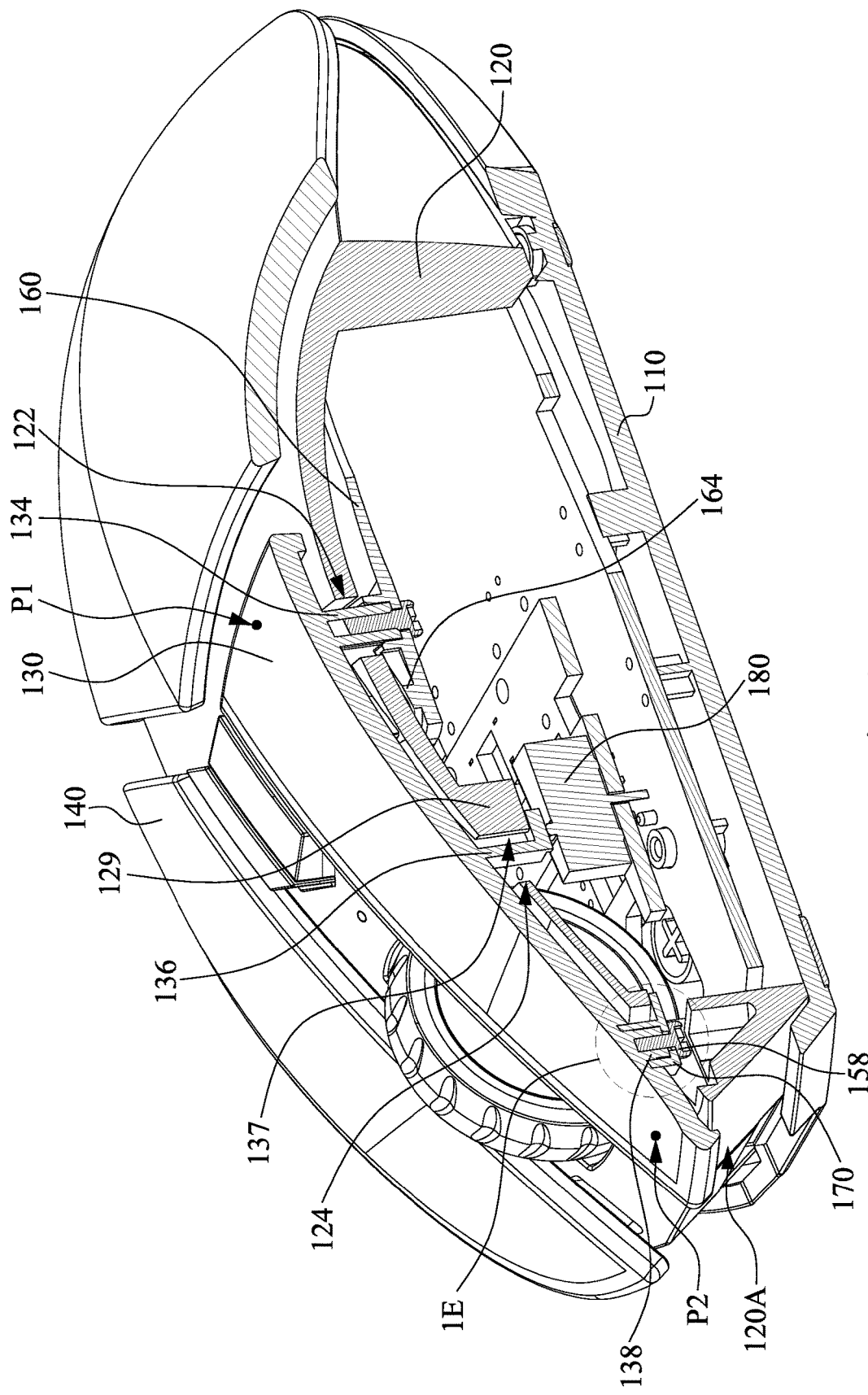
FIG. 1D is a perspective cross-section view of the mouse taken along line 1D-1D in FIG. 1B.
Figure 1F:
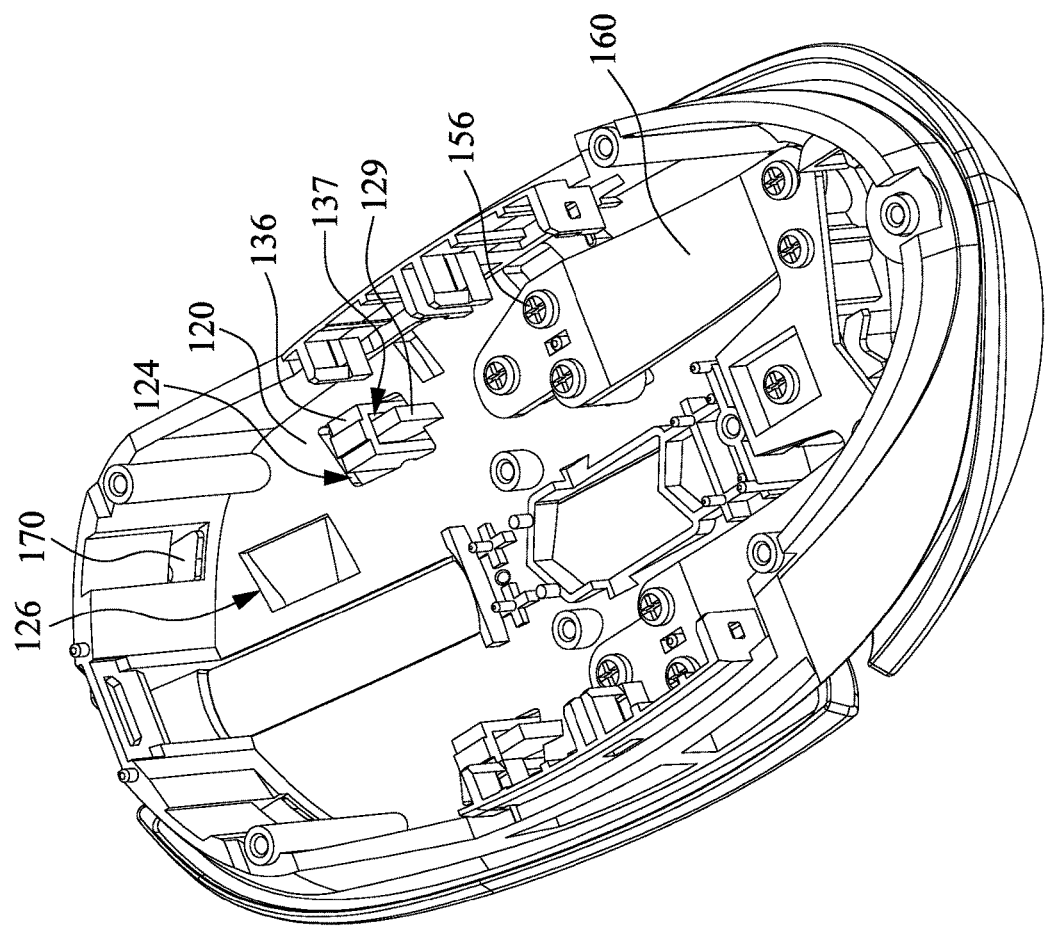
FIG. 1F is a schematic bottom view of a partial structure of the mouse in FIG. 1A.
Figure 1G:
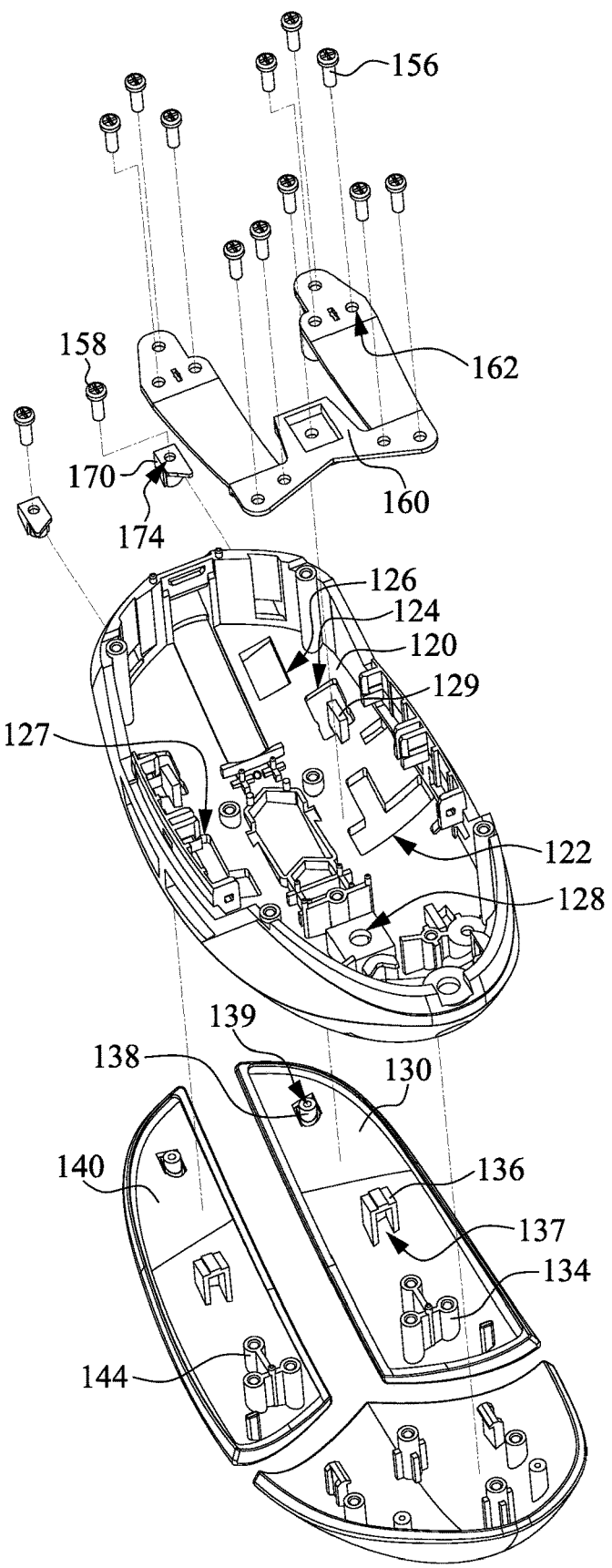
FIG. 1G is an exploded view of a partial structure in FIG. 1F.

Reference is made to FIGS. 1D and 1E. FIG. 1D is a perspective cross-section view of the mouse 100A taken along line 1D-1D in FIG. 1B, and FIG. 1E is a schematic enlarged view of an area 1E in FIG. 1D. In order to facilitate understanding, reference is also made to FIGS. 1F and 1G. FIG. 1F is a schematic bottom view of a partial structure of the mouse 100A in FIG. 1A, and FIG. 1G is an exploded view of a partial structure in FIG. 1F.

The first position limiter 160 is connected to the first protruding portion 134 of the first button 130, and the top housing 120 is located between the first button 130 and the first position limiter 160. The first position limiter 160 is fixed on the first protruding portion 134. More specifically, the mouse 100A may include multiple screw elements 156. After the first protruding portion 134 passes through the first hole 122, the screw elements 156 can pass through openings 162 of the first position limiter 160 and be screwed into the first protruding portion 134, so as to assemble the first position limiter 160 and the first protruding portion 134 together. In addition, the first position limiter 160 can be connected to the top housing 120. For example, the openings 162 of the first position limiter 160 can be aligned with the screw holes 128 of the top housing 120, so as to assemble the first position limiter 160 and the top housing 120 together through the screw elements 156.

The first position limiter 160 can be connected to the second button 140. For example, the second button 140 may has a fourth protruding portion 144 protruding toward to the top housing 120 from the second button 140. The top housing 120 further has a fourth hole 127. When assembling the mouse 100A, the fourth protruding portion 144 can be aligned with the fourth hole 127. After the fourth protruding portion 144 passes through the fourth hole 127, the screw elements 156 can be taken to pass through the openings 162 of the first position limiter 160 and be screwed into the fourth protruding portion 144, so as to assemble the first position limiter 160 and the fourth protruding portion 144 together. However, the present disclosure is not limited thereto. In other embodiments, the screw elements 156 can be omitted, and the first position limiter 160 can be fixed with the first protruding portion 134 and the fourth protruding portion 144 by clamping means.

Since the first protruding portion 134 of the first button 130 and the fourth protruding portion 144 of the second button 140 are assembled to the same position limiter (i.e. the first position limiter 160), the first button 130 can be referred to as being indirectly connected to the second button 140 by the first position limiter 160. Such arrangement that using the single position limiter to connect the two buttons would be advantageous to increase a usage rate of the space inside the mouse 100A.

The second protruding portion 136 may have a concave 137. The top housing 120 may have a bump 129 extending into the concave 137, such that the bump 129 can confine a movable distance of the second protruding portion 136. The mouse 100A may further include a pressure detector 180 disposed between the bottom housing 110 and the top housing 120. That is, the top housing 120 is disposed over the pressure detector 180. The second protruding portion 136 can be aligned with the pressure detector 180 and extend toward the pressure detector 180 after passing through the second hole 124. As shown in FIG. 1D, the second protruding portion 136 is in contact with the pressure detector 180, and at least one portion of the second protruding portion 136 is located between the pressure detector 180 and the bump 129 of the top housing 120.

The third protruding portion 138 is connected to the second position limiter 170, and the second position limiter 170 is fixed on the third protruding portion 138. More specifically, as shown in FIG. 1E, the second position limiter 170 may have a concave 172, and the third protruding portion 138 can extend into the concave 172, so as to connect the second position limiter 170. In addition, the first button 130 may have at least one trench 130T surrounding around the third protruding portion 138, and at least one portion of the second position limiter 170 is located within the trench 130T. The trench 130T of the first button 130 is formed to be advantageous to position the second position limiter 170 to the third protruding portion 138 around, and fixation strength of the second position limiter 170 with respect to the first button 130 can be enhanced by such position limit.

Furthermore, the second position limiter 170 and the third protruding portion 138 can be fixed together by screwing means. For example, the second position limiter 170 may have an opening 174, and the third protruding portion 138 has a screw hole 139. The mouse 100A may further have at least one screw element 158 passing through the opening 174 of the second position limiter 170 and screwed into the screw hole 139 of the third protruding portion 138, so as to fix the third protruding portion 138 and the second position limiter 170 together. However, the present disclosure is not limited thereto. In other embodiments, the screw elements 158 can be omitted, and the third protruding portion 138 and the second position limiter 170 can be fixed together by clamping means.

The second position limiter 170 can further extend to a position below the top housing 120, such the top housing 120 is located between the first button 130 and the second position limiter 170. For example, the top housing 120 has a first abutting surface S1 facing away from the first button 130. The second position limiter 170 has a second abutting surface S2 facing the first abutting surface S1, and the first abutting surface S1 can be located between the first button 130 and the second abutting surface S2. The second abutting surface S2 of the second position limiter 170 can be referred to as a surface that is formed by extending the second position limiter 170 along a direction away from the front end 120A of the top housing 120. By this arrangement, the top housing 120 and the second position limiter 170 interlocking with each other can become a hook structure.

The first position limiter 160 and the second position limiter 170 can be configured to a confine a movable distance of the first button 130 with respect to the top housing 120. More specifically, FIG. 1D illustrates the first button 130 without being pressed by an external force. Under such status, if a position near a point P1 of the first protruding portion 134 of the first button 130 is pressed, the first protruding portion 134 and an abutting portion 164 of the first position limiter 160 would be moved with respect to the top housing 120. At the same time, the second protruding portion 136 would be moved to press the pressure detector 180, so as to convert the pressing action to an electric signal. Thereafter, the first protruding portion 134 and the abutting portion 164 of the first position limiter 160 can be moved back to the original position due to an elasticity (e.g. elasticity of the first button 130 or the first position limiter 160), and such moving action can be terminated because the abutting portion 164 of the first position limiter 160 reaches the top housing 120.

Alternatively, under such status, if a position near a point P2 of the third protruding portion 138 of the first button 130 is pressed, the third protruding portion 138 would move toward the top housing 120, and the second abutting surface S2 of the second position limiter 170 would be moved away from the first abutting surface S1 of the top housing 120. At the same time, the second protruding portion 136 would be moved to press the pressure detector 180, so as to convert the pressing action to an electric signal. Thereafter, the third protruding portion 138 and the second position limiter 170 can be moved back to the original position due to the elasticity of the first button 130, and such moving action can be terminated because the second abutting surface S2 of the second position limiter 170 reaches the first abutting surface S1 of the top housing 120.

Furthermore, when some regions of the first button 130 are pressed, the body of the second position limiter 170 can serve as a fulcrum, such that a torque which is applied to the first button 130 would be sufficient to move the second protruding portion 136 toward the pressure detector 180. More specifically, as shown in FIGS. 1B and 1D, when an edge region E of the first button 130 in FIG. 1B is pressed, the second position limiter 170 can serve as a fulcrum such that a torque applied to the first button 130 can make the second protruding portion 136 move toward and press the pressure detector 180.

Therefore, by disposing the second position limiter 170, it can be achieved that pressing the edge region E of the first button 130 can make the pressure detector 180 pressed, thereby improving a better use experience that the mouse 100A provides to a user. That is, when a user presses the edge region E of the first button 130, the mouse 100A can be operated with response to the pressing action.

In other words, when an edge region of a button in a mouse without disposing a second position limiter is pressed, at least one region of the button near a front end of the mouse would move away from a top housing thereof due to a torque applied to the button, such that a pressure detector thereof would not be pressed. That is, when a user presses the edge region of such mouse, the mouse would not be operated with response to the pressing action.

In addition, the pressable range for pressing the first button 130 can be adjusted by adjusting a relative positional relationship between different protruding portions. For example, in some embodiments, the second protruding portion 136 can overlap with a line connecting the first protruding portion 134 and the third protruding portion 138, as shown in FIG. 1C. However, the present disclosure is not limited thereto. In other embodiments, the second protruding portion 136 can be displaced from the line connecting the first protruding portion 134 and the third protruding portion 138.

Furthermore, since the internal volume of the top housing 120 of the mouse 100A near the front end 120A is less than that near the other places thereof (e.g. the back end 120B), the second position limiter 170 is suitable to be designed as miniaturization, so as to comply the internal volume of the top housing 120. More specifically, a vertical projection area of the second position limiter 170 on the bottom housing 110 may be smaller than a vertical projection area of the first button 130 on the bottom housing 110, and a vertical projection of the second position limiter 170 onto the bottom housing 110 is entirely within a vertical projection of the first button 130 onto the bottom housing 110.

Figure 2:
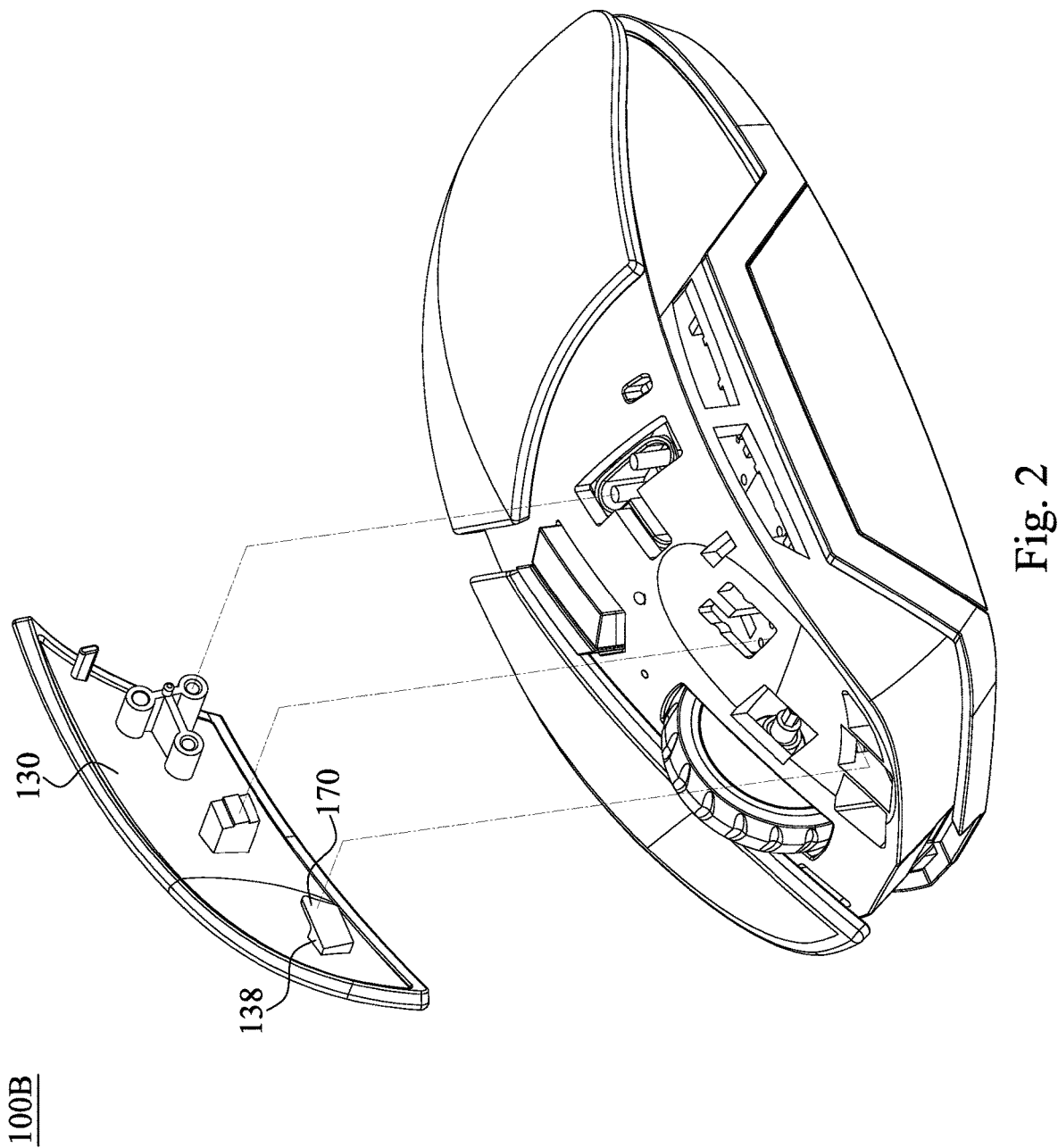
FIG. 2 is a schematic perspective view illustrating a mouse according to a second embodiment of the present disclosure.

Reference is made to FIG. 2 that is a schematic perspective view illustrating a mouse 100B according to a second embodiment of the present disclosure. At least one difference between the present embodiment and the first embodiment is that a first button 130 and a second position limiter 170 are formed in one piece. In other words, a second abutting surface S2 as described above can be taken as to directly form on a third protruding portion 138 of the first button 130.

As described above, the mouse of the present disclosure includes the pressure detector, the top housing, the first button, the first position limiter, and the second position limiter. The first button is disposed on the top housing and has the first protruding portion, the second protruding portion, and the third protruding portion. The first protruding portion is connected to the first position limiter, and the top housing is located between the first button and the first position limiter. The second protruding portion is in contact with the pressure detector. The third protruding portion is connected to the second position limiter, and the top housing is located between the first button and the second position limiter. By this arrangement, when the edge region of the first button is pressed, the second position limiter can serve as a fulcrum, such that a torque applied to the first button would cause the second protruding portion to press the pressure detector, thereby having the mouse to be operated with response to the pressing action.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A mouse, comprising:
   a pressure detector;
   a top housing disposed on the pressure detector and having a first hole, a second hole, and a third hole, wherein the second hole is located between the first hole and the third hole;
   a first button disposed on the top housing and having a first protruding portion, a second protruding portion, and a third protruding portion protruding toward the top housing, wherein the first protruding portion is aligned with the first hole, the second protruding portion is aligned with the second hole and extends toward the pressure detector through the second hole, and the third protruding portion is aligned with the third hole;
   a first position limiter connected to the first protruding portion so as to confine a movable distance of the first button above the top housing, wherein the top housing is located between the first button and the first position limiter;
   a second position limiter connected to the third protruding portion, wherein the top housing is located between the first button and the second position limiter; and
   a case disposed on the top housing, wherein the case and the first button are separated from each other.

2. The mouse of claim 1, wherein the top housing has a front end and a back end which are opposite each other, the second position limiter is closer to the front end than the first position limiter, and the first position limiter is closer to the back end than the second position limiter.

3. The mouse of claim 1, further comprising a second button disposed on the top housing, and the first button and the second button are separated from each other.

4. The mouse of claim 3, wherein the top housing further has a fourth hole, the second button has a fourth protruding portion aligned with the fourth hole and protruding toward the top housing, wherein the first position limiter is connected to the fourth protruding portion such that the first button indirectly connected to the second button by the first position limiter.

5. The mouse of claim 3, wherein the case and the second button are separated from each other.

6. The mouse of claim 1, wherein the first button further has a pressing surface that faces away from the top housing and is a curved surface.

7. The mouse of claim 1, further comprising a bottom housing, wherein the top housing is assembled on the bottom housing and a distance from the top housing to the bottom housing gradually decreases from a position corresponding to the first hole to a position corresponding to the third hole.

8. The mouse of claim 1, wherein the second position limiter has a concave shape, and the third protruding portion extends into the concave shape.

9. The mouse of claim 1, wherein the second position limiter has an opening, the third protruding portion has a screw hole, and the mouse further comprises a screw element passing through the opening and screwed into the screw hole.

10. The mouse of claim 1, wherein the top housing has a first abutting surface facing away from the first button, the second position limiter has a second abutting surface facing the first abutting surface, and the first abutting surface is located between the first button and the second abutting surface.

11. The mouse of claim 1, wherein the second protruding portion overlaps with a line connecting the first protruding portion and the third protruding portion.

\* \* \* \* \*